United States Patent
Chen et al.

(10) Patent No.: US 9,854,524 B2
(45) Date of Patent: Dec. 26, 2017

(54) GEOGRAPHICALLY ISOLATED ANTENNAS

(71) Applicant: Intel Corporation, Santa Clara, CA (US)

(72) Inventors: Xiaogang Chen, Beijing (CN); Yuan Zhu, Chao Yang District (CN); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/806,974

(22) Filed: Jul. 23, 2015

(65) Prior Publication Data

US 2016/0204843 A1    Jul. 14, 2016

Related U.S. Application Data

(63) Continuation of application No. 13/996,694, filed as application No. PCT/US2012/031692 on Mar. 30, 2012, now Pat. No. 9,113,489.

(Continued)

(51) Int. Cl.
*H04L 1/02* (2006.01)
*H04W 52/02* (2009.01)
(Continued)

(52) U.S. Cl.
CPC ........ *H04W 52/0222* (2013.01); *H04B 7/024* (2013.01); *H04B 7/0417* (2013.01);
(Continued)

(58) Field of Classification Search
CPC ............... H04W 52/04; H04W 76/064; H04W 52/0235; H04W 72/042; H04W 28/042;
(Continued)

(56) References Cited

U.S. PATENT DOCUMENTS 8,687,555 B2    4/2014  Ko et al.
2008/0227495 A1   9/2008  Kotecha et al.
(Continued)

FOREIGN PATENT DOCUMENTS

CN    104081682 A    10/2014
WO    2010/102583 A1    9/2010
(Continued)

OTHER PUBLICATIONS

International Preliminary Report on Patentability and Written Opinion received for PCT Patent Application No. PCT/US2012/031692, dated Apr. 10, 2014, 9 pages.
(Continued)

*Primary Examiner* — Helene Tayong
(74) *Attorney, Agent, or Firm* — Alpine Technology Law Group LLC

(57) ABSTRACT

Briefly, in accordance with one or more embodiments, a base transceiver station having a first set of antennas and a second set of antennas geographically separated from the first set of antennas transmits a reference signal to a first device, and receives feedback from the first device. The feedback represents information that can be used to construct a weight adjustment vector. The base transceiver station selects a precoding vector from a codebook based at least in part on the feedback received from the first device, calculates the weight adjustment vector based at least in part on the feedback, and applies the weight adjustment vector to the selected precoding vector to provide an adjusted precoding vector. The base transceiver station then may transmit data to the first device using the adjusted precoding vector.

16 Claims, 8 Drawing Sheets

Related U.S. Application Data

(60) Provisional application No. 61/542,086, filed on Sep. 30, 2011.

(51) Int. Cl.

| | | |
|---|---|---|
| *H04W 48/16* | (2009.01) | |
| *H04B 7/06* | (2006.01) | |
| *H04B 7/0456* | (2017.01) | |
| *H04L 12/891* | (2013.01) | |
| *H04W 52/04* | (2009.01) | |
| *H04L 5/00* | (2006.01) | |
| *H04W 72/04* | (2009.01) | |
| *H04W 4/08* | (2009.01) | |
| *H04W 36/00* | (2009.01) | |
| *H04W 28/04* | (2009.01) | |
| *H04W 4/06* | (2009.01) | |
| *H04W 72/00* | (2009.01) | |
| *H04W 72/12* | (2009.01) | |
| *H04W 76/04* | (2009.01) | |
| *H04L 12/709* | (2013.01) | |
| *H04W 48/18* | (2009.01) | |
| *H04W 72/08* | (2009.01) | |
| *H04W 76/06* | (2009.01) | |
| *H04B 7/024* | (2017.01) | |
| *H04B 7/0417* | (2017.01) | |
| *H04W 52/14* | (2009.01) | |
| *H04W 84/04* | (2009.01) | |
| *H04W 52/54* | (2009.01) | |
| *H04L 12/18* | (2006.01) | |
| *H04L 25/02* | (2006.01) | |
| *H04W 28/10* | (2009.01) | |
| *H04W 52/24* | (2009.01) | |
| *H04W 52/36* | (2009.01) | |
| *H04W 48/12* | (2009.01) | |

(52) U.S. Cl.
CPC ......... *H04B 7/0456* (2013.01); *H04B 7/0615* (2013.01); *H04B 7/0619* (2013.01); *H04L 5/0032* (2013.01); *H04L 5/0037* (2013.01); *H04L 45/245* (2013.01); *H04L 47/41* (2013.01); *H04W 4/06* (2013.01); *H04W 4/08* (2013.01); *H04W 28/042* (2013.01); *H04W 36/0005* (2013.01); *H04W 48/16* (2013.01); *H04W 48/18* (2013.01); *H04W 52/0235* (2013.01); *H04W 52/04* (2013.01); *H04W 52/146* (2013.01); *H04W 72/005* (2013.01); *H04W 72/042* (2013.01); *H04W 72/0446* (2013.01); *H04W 72/082* (2013.01); *H04W 72/1215* (2013.01); *H04W 72/1278* (2013.01); *H04W 72/1294* (2013.01); *H04W 76/048* (2013.01); *H04W 76/064* (2013.01); *H04B 7/0613* (2013.01); *H04L 12/189* (2013.01); *H04L 25/0204* (2013.01); *H04W 28/10* (2013.01); *H04W 48/12* (2013.01); *H04W 52/244* (2013.01); *H04W 52/365* (2013.01); *H04W 52/54* (2013.01); *H04W 72/0426* (2013.01); *H04W 84/042* (2013.01); *Y02B 60/50* (2013.01)

(58) Field of Classification Search
CPC ............... H04W 4/08; H04W 36/0005; H04W 72/1215; H04W 76/048; H04W 72/1294; H04B 7/0456; H04B 7/0615; H04B 7/0615; H04L 5/0032; H04L 5/0037; H04L 45/245
USPC ........................................................ 375/267
See application file for complete search history.

(56) References Cited

U.S. PATENT DOCUMENTS

| | | |
|---|---|---|
| 2009/0046569 A1 | 2/2009 | Chen et al. |
| 2009/0080560 A1 | 3/2009 | Na et al. |
| 2009/0093222 A1* | 4/2009 | Sarkar ............... H04B 7/0617 455/115.1 |
| 2010/0035555 A1 | 2/2010 | Bala et al. |
| 2010/0150267 A1 | 6/2010 | Zangi |
| 2010/0239032 A1 | 9/2010 | Chen et al. |
| 2011/0032839 A1* | 2/2011 | Chen ................ H04B 7/024 370/252 |
| 2011/0085537 A1 | 4/2011 | Tsai et al. |
| 2011/0086654 A1 | 4/2011 | Larsson |
| 2011/0110251 A1* | 5/2011 | Krishnamurthy ... H04W 72/082 370/252 |
| 2011/0188481 A1* | 8/2011 | Damnjanovic ....... H04W 72/04 370/336 |
| 2011/0207415 A1 | 8/2011 | Luo et al. |
| 2011/0216846 A1* | 9/2011 | Lee ................ H04B 7/0473 375/295 |
| 2011/0243007 A1 | 10/2011 | Xiao |
| 2011/0274205 A1 | 11/2011 | Lee et al. |
| 2012/0063500 A1* | 3/2012 | Wang .................. H04L 1/0026 375/224 |
| 2012/0213095 A1* | 8/2012 | Krishnamurthy ....... H04L 5/001 370/252 |
| 2012/0219083 A1* | 8/2012 | Tong .................. H04B 7/0417 375/267 |
| 2012/0269278 A1 | 10/2012 | Onggosanusi et al. |
| 2012/0314654 A1 | 12/2012 | Kotecha et al. |
| 2012/0314806 A1 | 12/2012 | Kang et al. |
| 2013/0010888 A1* | 1/2013 | Moulsley ............... H04B 7/063 375/267 |
| 2013/0058424 A1 | 3/2013 | Enescu et al. |
| 2013/0094543 A1* | 4/2013 | Zhang ................ H04L 5/0023 375/219 |
| 2013/0114425 A1 | 5/2013 | Sayana et al. |
| 2013/0170437 A1 | 7/2013 | Onggosanusi et al. |
| 2013/0182787 A1* | 7/2013 | Kakishima ........... H04B 7/0652 375/267 |
| 2013/0208604 A1 | 8/2013 | Lee et al. |

FOREIGN PATENT DOCUMENTS

| | | |
|---|---|---|
| WO | 2010102583 | 9/2010 |
| WO | 2013/048568 A1 | 4/2012 |

OTHER PUBLICATIONS

Schwarz, et al., "Mutual Information based Calculation of the Precoding Matrix Indicator for 3GPP UMTS/LTE", 2010 International ITG Workshop on Smart Antennas (WSA 2010), Vienna University of Technology, Institute of Communications and Radio-Frequency Engineering Gusshausstrasse 25/389, A-1040 Vienna, Austria, IEEE, pp. 52-58.

Alcatel-Lucent, "Considerations on CSI feedback enhancements for high-priority antenna configurations", Alcatel-Lucent Shanghai Bell and Alcatel-Lucent, 3GPP TSG-RAN WG1 #66, R1-112420, Athens, Greece, Aug. 22-26, 2011, 7 pages.

Catt, "CSI feedback for geographically-separated antennas", 3GPP TSG RAN WG1 Meeting #66, R1-112116, Athens, Greece, Aug. 22-26, 2011, 3 pages.

Fujitsu, "Possibilities of using global precoding scheme in enhanced DL MIMO for geographically separated antennas", 3GPP TSG RAN WG1 meeting #66, R1-112658, Athens, Greece, Aug. 22-26, 2011, 3 pages.

Huawei, Hisilicon, "Analysis of closed-loop downlink MIMO rank adaptation with received power imbalance", 3GPP TSG RAN WG1 Meeting #66, R1-112046, Athens, Greece, Aug. 22-26, 2011, 5 pages.

Intel Corporation, "Analysis of Geographically Isolated Antenna", Intel Corporation, 3GPP TSG RAN WG1 meeting #66bis, R1-113203, Zhuhai, China Oct. 10-14, 2011, 4 pages.

(56) References Cited

OTHER PUBLICATIONS

LG Electronics, "Consideration on CSI feedback for geographically separated antennas", 3GPP TSG RAN WG1 Meeting #66, R1-112478, Athens, Greece, Aug. 22-26, 2011, 5 pages.
International Search Report and Written Opinion received for PCT Patent Application No. PCT/US2012/031692, dated Oct. 31, 2012, 13 pages.
Extended European Search Report received for European Patent Application No. 12836718.2, dated Sep. 21, 2015, 8 pages.
Office Action received for Chinese Patent Application No. 201280059321.8, dated Jul. 4, 2016, 22 pages including 13 pages of English translation.
Ericsson, "Discussion on Real-Life DL MIMO Issues", Discussion, Aug. 2011, 6 pages, 3GPP TSG-RAN WG1, Athens, Greece.
Office Action received for Chinese Patent Application No. 201280059321.8, dated Dec. 23, 2016, 24 pages including 14 pages of English translation.
Huawei, HiSilicon, "Analysis of closed-loop downlink MIMO rank adaptation with received power imbalance", Discussion, Aug. 22-26, 2011, 5 pages 3GPP TSG RAN WG1 meeting, Athens, Greece.
Decision on Rejection, Counterpart Application No. 201280059321.8, dated Aug. 15, 2017, 25 pages.
Huawei et al: "Analysis of closed-loop downlink MIMO rank adaptation with received power imbalance", 3GPP Draft; R1-112046, 3rd Generation Partnership Project (3GPP), Mobile Competence Centre ; 650, Route Des Lucioles ; F-06921 Sophia-Antipolis Cedex ; France, vol. RAN WG1, no. Athens, Greece; 20110822, Aug. 22-26, 2011, 5 pages.
Office Action for Chinese Application No. 201280059321.8, dated Apr. 5, 2017, 13 pages.

\* cited by examiner

GEOGRAPHICALLY ISOLATED ANTENNAS

CROSS REFERENCE TO RELATED APPLICATIONS

The present application is a continuation of U.S. application Ser. No. 13/966,694 filed Sep. 20, 2013, which in turn is the National Stage Application of International Application No. PCT/US2012/031692 filed on Mar. 30, 2012, which in turn claims the benefit of U.S. Provisional Application No. 61/542,086 filed on Sep. 30, 2011. Said application Ser. No. 13/966,694, said Application No. PCT/US2012/031692, and said Application No. 61/542,086 are hereby incorporated herein by reference in their entireties.

BACKGROUND

Geographically isolated antennas may be deployed to provide enhanced downlink multiple input, multiple output (MIMO) transmissions. For example, such a deployment may be utilized for indoor antenna deployment, in heterogeneous networks, coordinated multipoint (CoMP) transmissions wherein join transmission may be considered as one or more geographically separated antennas in a single cell. However, geographically isolated antennas may present potential issues such as with reference signal received power (RSRP) measurements or resulting antenna gain imbalance (AGI) caused by the large antenna separation distance between different antennas. Geographically separated antenna subsets may experience different channel conditions resulting in severe AGI which may potentially impact performance of the system. Current systems assume that all antennas of a base station or enhanced node B (eNB) in a cell are geographically co-located. The RSRP measurements are only obtained for one or two antennas, for example from common reference signal (CRS) port 0 or port 1, and the measurements are applied to all of the antennas of the system. However, the assumption may not be valid for geographically separated antennas that experience different channel conditions depending on their specific location, and as a result the measurements will not adequately reflect the real conditions of the cell.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
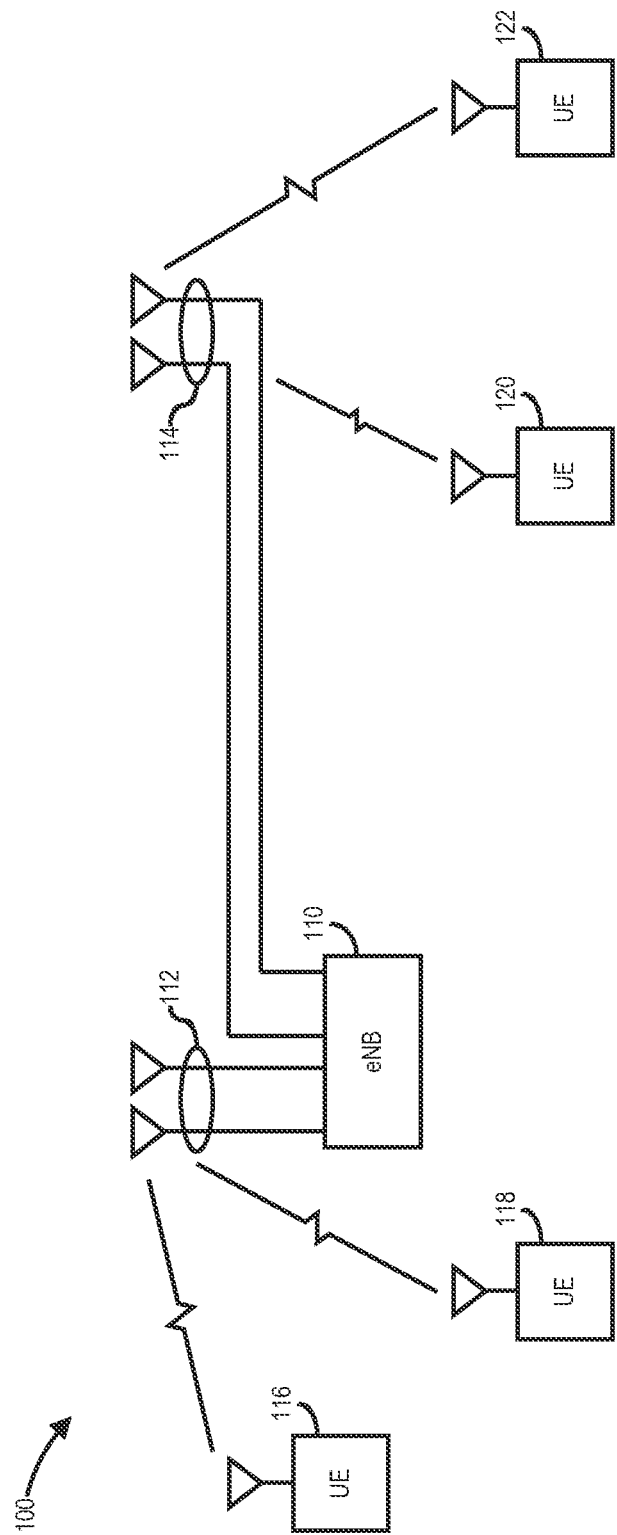
FIG. 1 is a diagram of an enhanced Node B (eNB) having geographically separated antennas in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an enhanced Node B (eNB) having geographically separated antennas in accordance with one or more embodiments will be discussed. As shown in FIG. 1, a wireless network 100 may comprise an enhanced Node B (eNB) 110 serving one or more user equipment (UE) devices such as UE 116, UE 118, UE 120, and UE 120 in the embodiment shown. The eNB 110 may have multiple antennas, for example a first set of antennas 112 and a second set of antennas 114 wherein the first set of antennas 112 and the second set of antennas 114 may be geographically separated by a significant distance. In other words, the first set of antennas 112 and the second set of antennas 114 are not co-located. In such an arrangement, a first group of UE devices such as UE 116 and UE 118 may be in communication with the eNB 112 via the first set of antennas 112, and a second group of UE devices such as UE 120 and UE 122 may be in communication with the eNB 110 via the second set of antennas 114. It should be noted that the eNB 110 and the UE devices may be operating in compliance with a Long Term Evolution (LTE) standard and/or any developments or advancements of such a standard, for example LTE-Advanced, wherein network 100 may comprise an LTE network. In general, eNB 110 may be referred to generically as a base transceiver station or just a base station, and any one or more of the UEs may be referred to generically as a mobile station, mobile device, or just device, and the scope of the claimed subject matter is not limited in these respects. It should be noted network 100 may be discussed herein as an LTE network for purposes of discussion, but network 100 may comprise any type of wireless network such as a wireless wide area network (WWAN), a wireless local area network (WLAN), or the like, in compliance with any various wireless network standard such as a Worldwide Interoperability for Microwave Access (WiMAX) network in compliance with an Institute of Electrical and Electronics Engineers (IEEE) 802.16e standard, a WiMAX-II network in compliance with an IEEE 802.16m standard, and so on, and the scope of the claimed subject matter is not limited in this respect.

As shown in FIG. 1, since the two sets of antennas of eNB 110 are geographically separated, the first set of antennas 112 may experience different channel conditions than that of the second set of antennas 114. As a result, there may be resulting antenna gain imbalance (AGI) among the antennas of the eNB 110. In such a situation, any channel measurements made with the first set of antennas 112, for example reference signal received power (RSRP) measurements, may not be valid for the second set of antennas 114. For example, in the current LTE specification, the RSRP measurement utilizes common reference signal (CRS) port 0 and optionally utilizes CRS port 1, both of which may be mapped to the first set of antennas 112. The measurements for the first set of antennas 112 are then applied to all of the antennas of eNB 110 including the second set of antennas 114. However, with any AGI resulting from the geographically separated antennas, the measurements taken on only one set of antennas cannot be applied to the other sets of antennas. As a result, adjustments may be made in order to accommodate for such AGI as discussed in further detail, below.

Figure 2:
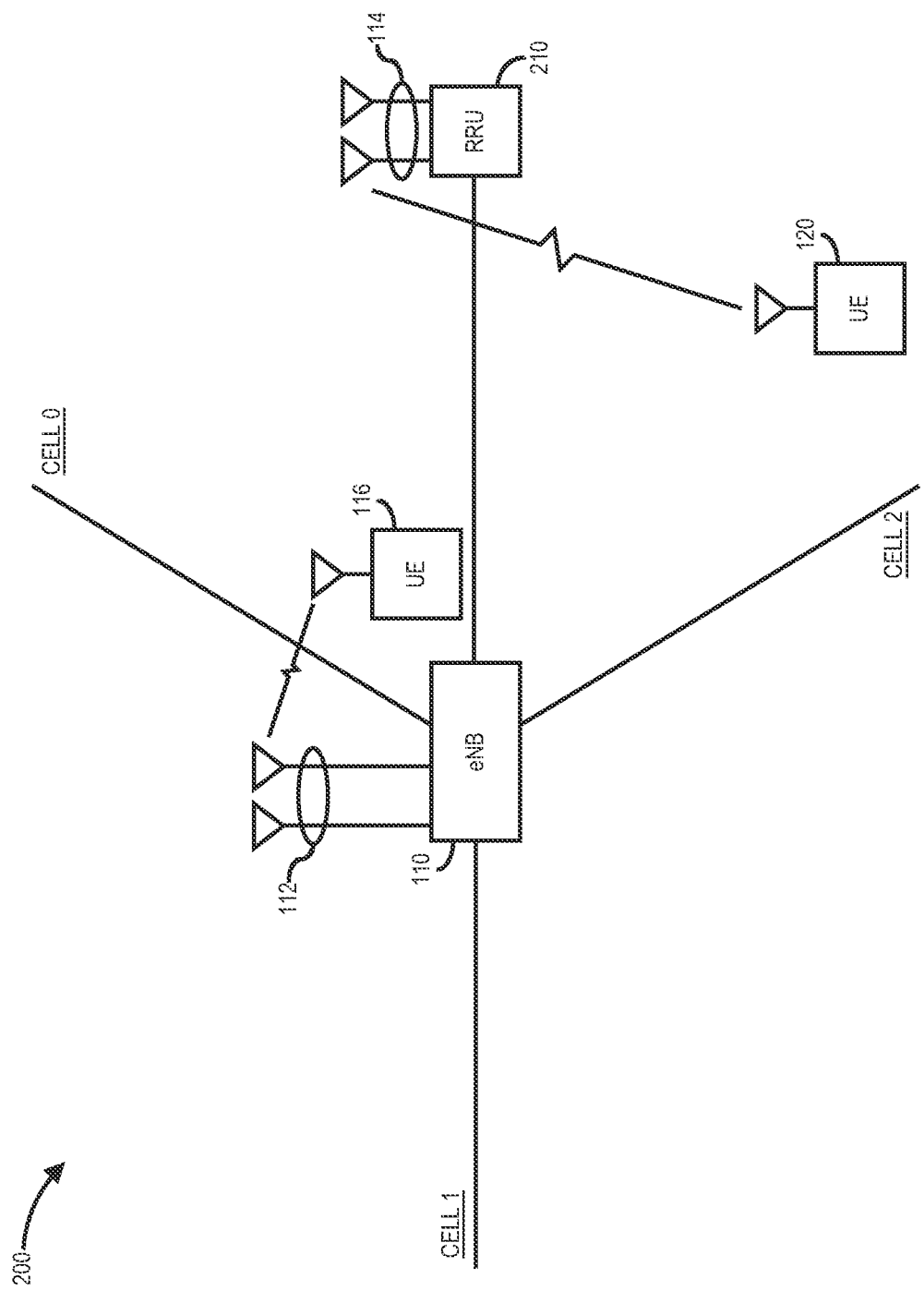
FIG. 2 is a diagram of an enhanced Node B (eNB) having geographically separated antennas in a cell utilizing a remote radio unit (RRU) in accordance with one or more embodiments.

Referring now to FIG. 2, a diagram of an enhanced Node B (eNB) having geographically separated antennas in a cell utilizing a remote radio unit (RRU) in accordance with one or more embodiments will be discussed. In the example shown in FIG. 2, enhanced Node B (eNB) 110 of network 200 may serve three cells such as Cell 0, Cell 1, and Cell 2. The first set of antennas 112 of eNB 110 may be utilized to communicate with user equipment (UE) 116 that is in close proximity to the first set of antennas 112. UE devices that are located toward a distal region of any of the cells away from the eNB 110, such as UE 120, may communicate with eNB 110 via a second set of antennas 114 that are geographically separated in a cell from the first set of antennas 112. In some embodiments, the second set of antennas 114 may be the antennas of a remote radio unit (RRU) 210 coupled to eNB 110, for example in a Coordinated Multipoint (CoMP) deployment. In some embodiments, multiple RRUs coupled to eNB 110 may be utilized within a single cell wherein the RRUs have a corresponding additional set of antennas to communicate with one or more UEs depending on the location of the UE with respect to eNB 110 and given RRU, signal strength, channel conditions, and so on. It should be noted, however, that FIG. 2 illustrates an example deployment of multiple sets of geographically separated antennas using one or more RRUs, and the scope of the claimed subject matter is not limited in this respect.

Figure 3:
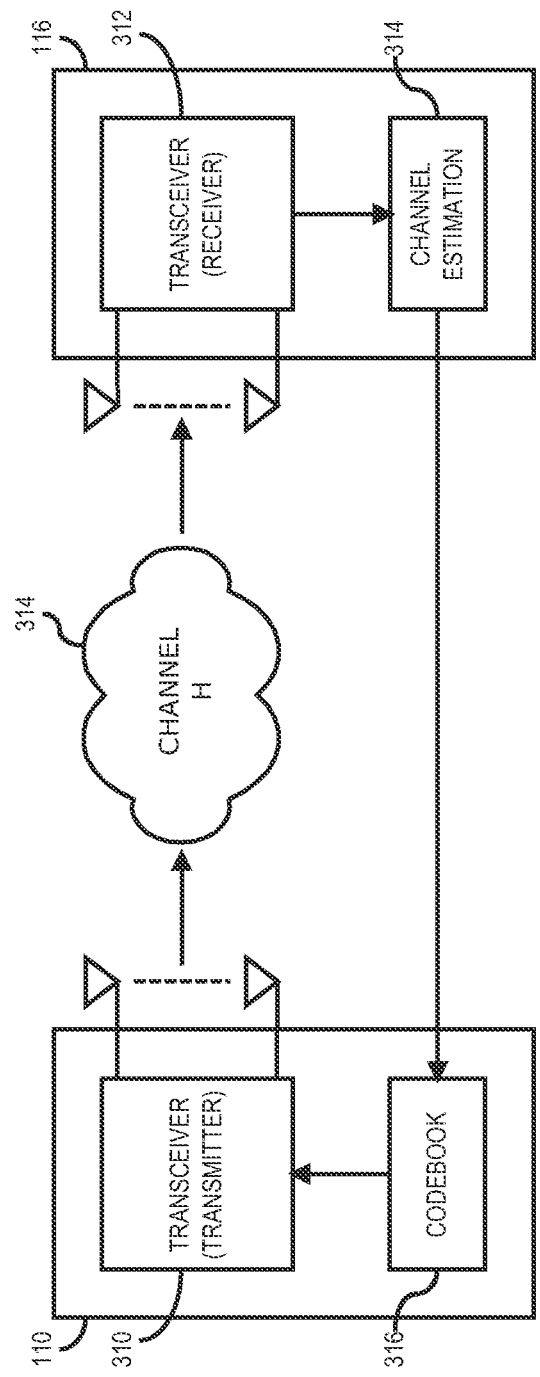
FIG. 3 is a diagram of an enhanced Node B (eNB) utilizing a codebook to select a precoding vector based at least in part on a channel condition in accordance with one or more embodiments.

Referring now to FIG. 3, a diagram of an enhanced Node B (eNB) utilizing a codebook to select a precoding vector based at least in part on a channel condition in accordance with one or more embodiments will be discussed. As shown in FIG. 3, the enhanced Node B (eNB) 110 may utilize a codebook 316 to select an appropriate precoding vector W based at least in part on a condition of the channel H 314. In such an arrangement, the transmitter of the transceiver 310 of eNB 110 transmits reference signals to the receiver of the transceiver 312 of user equipment (UE) 116. The UE 116 then may estimate the channel via channel estimation block 314 as determined from the received reference signals. The UE 116 may then provide feedback to the eNB 110, for example as a precoding matrix index (PMI), that is utilized by the eNB 100 to select an appropriate precoding vector from the codebook 316. The eNB 110 may then transmit data to the UE 116 using the precoding vector to weight the transmitted data to accommodate for the conditions of the channel H 314. In one or more embodiments, the precoding vector W may be adjusted via adjustment of the codebook 316 in order to accommodate any antenna gain imbalance (AGI) that is detected between two or more sets of geographically separated antennas.

Figure 4:
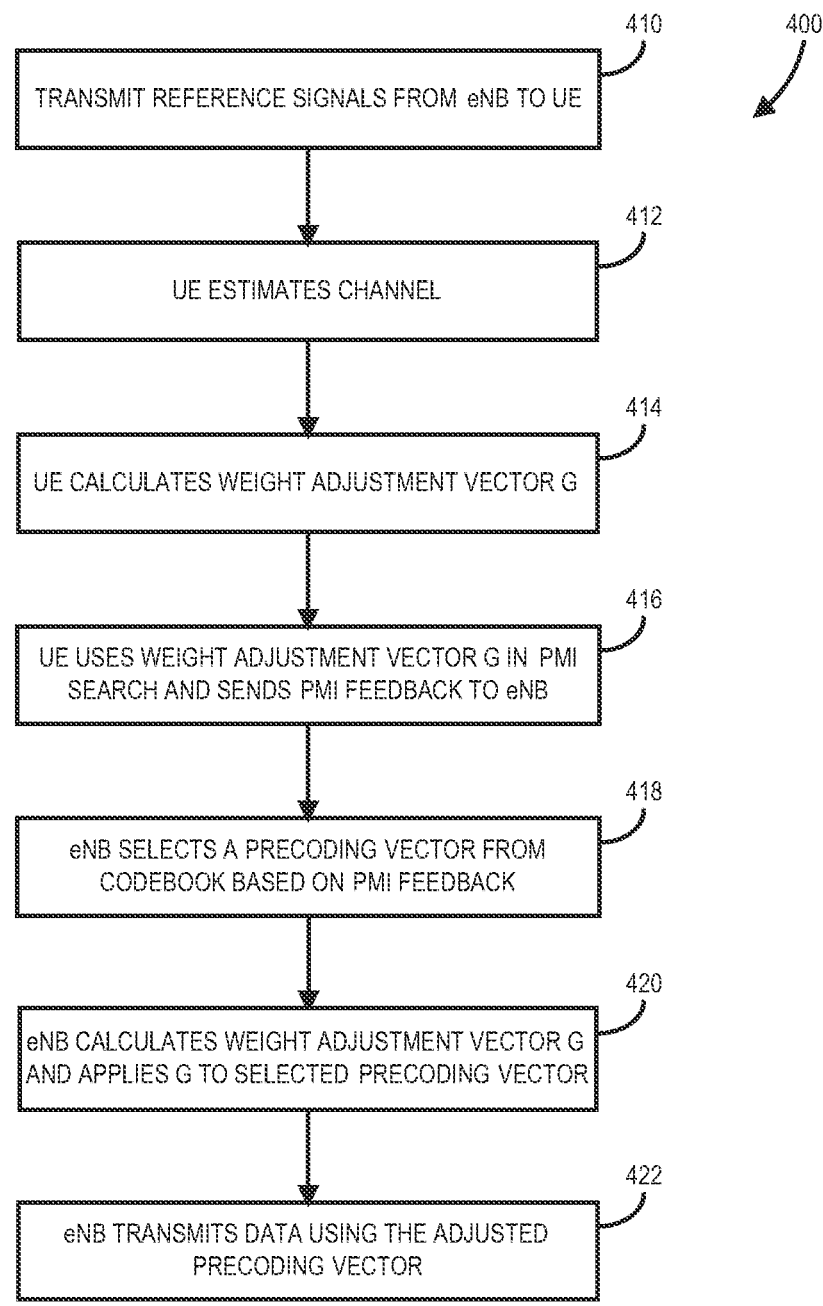
FIG. 4 is a flow diagram of a method to adjust the codebook for geographically separated antennas based at least in part on measured antenna gain imbalance (AGI) in accordance with one or more embodiments.

Referring now to FIG. 4, a flow diagram of a method to adjust the codebook for geographically separated antennas based at least in part on measured antenna gain imbalance (AGI) in accordance with one or more embodiments will be discussed. Although method 400 of FIG. 4 illustrates one particular embodiment of a method to adjust a codebook 316, other embodiments of method 400 may include greater or fewer blocks than shown, and/or in various different orders, and the scope of the claimed subject matter is not limited in this respect. Method 400 adjusts the codebook 316 based at least in part on a determined AGI among two or more sets of antennas of eNB 110. Since the codebook 316 of a current Long Term Evolution (LTE) standard is designed for co-located antennas without considering AGI, on one or more embodiments, the AGI may be determined at least in part, and an appropriate adjustment of the precoding vector may be performed as follows:

$$W_{adj} = G * W_{org}$$

wherein $W_{org}$ is the original precoding vector from the codebook 316, G is the weight adjustment vector, and $W_{adj}$ is the precoding vector after adjustment with the weight adjustment vector. The weight adjustment vector G is able to indicate the relative value of antenna gain for the distributed antennas of the multiple sets of antennas that may experience AGI. In one or more embodiments, the weight adjustment vector G may be derived from reference signal received power (RSRP) measurements reported by the UE 116, or alternatively by sounding reference signals (RS) measured at the eNB 110. For example, the weight adjustment vector G may be calculated as follows:

$$G = \text{diag}([RSRP_1 RSRP_2 \ldots RSRPn_t])$$

wherein $n_t$ represents the number of transmission antennas at the eNB 110. Method 400 represents one embodiment to implement utilizing a weight adjustment vector G to adjust the precoding vector obtained from codebook 316. The approach of method 400 may be referred to as non-transparent to the UE 116 wherein the UE 116 adjusts the codebook 316 with the weight adjustment vector G before the precoding matrix indicator (PMI) search. In such an embodiment, reference signals are transmitted from the eNB 110 to the UE 116 at block 410. The UE 116 then estimates the channel at block 412 using the received reference signals. The UE 116 then calculates the weight adjustment vector G at block 414 which may be based at least in part on the reference signals, for example RSRP measurements. The UE 116 utilizes the weight adjustment vector G in the PMI search at block 416 and provides PMI feedback to the eNB 110. With this PMI feedback received from the UE 116, the eNB 110 selects a precoding vector from the codebook 316 at block 418 based on the PMI feedback and applies the adjustment vector G to the selected precoding vector at block 420. The weight adjustment vector G is calculated or reconstructed by the eNB 110 from RSRP feedback or sounding reference signal (RS). The eNB 110 may then transmit data at block 422 using the adjusted precoding vector.

Figure 5:
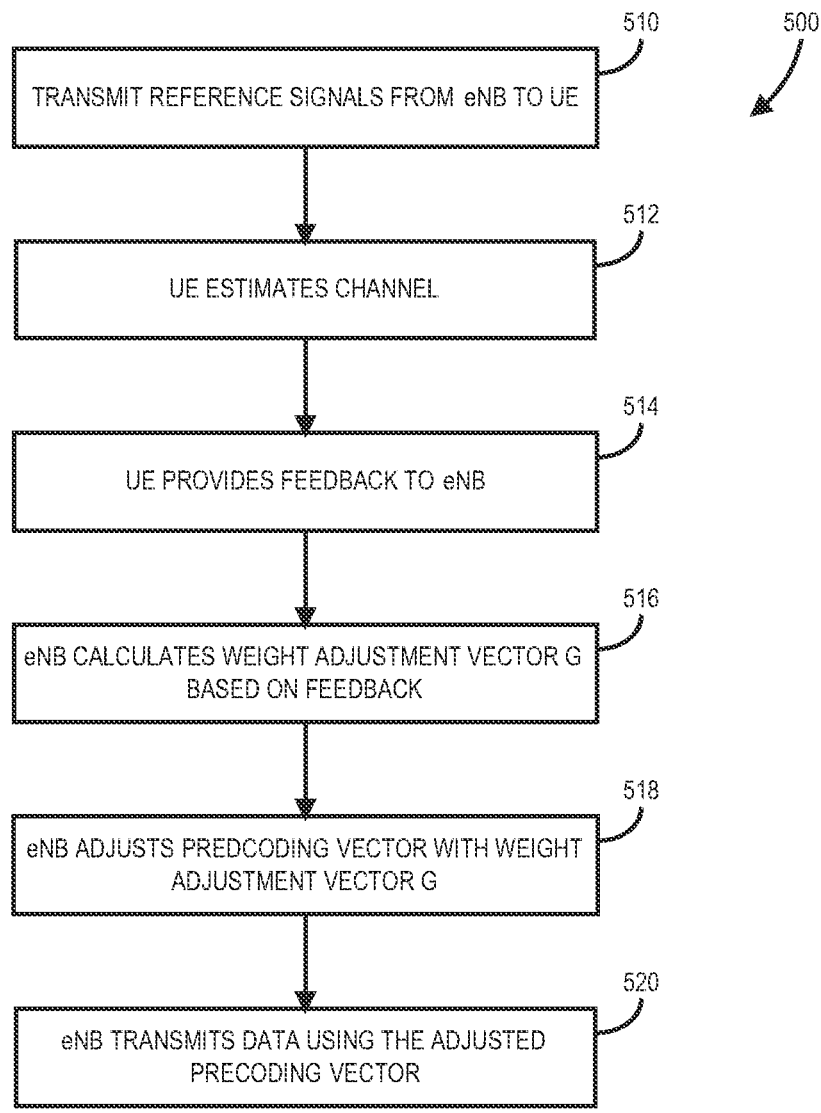
FIG. 5 is a flow diagram of an alternative method to adjust the codebook for geographically separated antennas based at least in part on measured antenna gain imbalance (AGI) in accordance with one or more embodiments.

Referring now to FIG. 5, a flow diagram of an alternative method to adjust the codebook for geographically separated antennas based at least in part on measured antenna gain imbalance (AGI) in accordance with one or more embodiments will be discussed. Although method 500 of FIG. 5 illustrates one particular embodiment of a method to adjust a codebook 316, other embodiments of method 500 may include greater or fewer blocks than shown, and/or in various different orders, and the scope of the claimed subject matter is not limited in this respect. Method 500 of FIG. 5 is similar to method 400 of FIG. 4 except that method 500 may be referred to as transparent to the UE 116 wherein the UE 116 searches and feeds back the precoding matrix indicator (PMI) without codebook adjustment by the UE 116. In such an embodiment, the eNB 100 transmits reference signals to the UE 116 at block 510, and the UE 116 estimates the channel at block 512. The UE 116 then provides PMI feedback to the eNB 110 at block 514 without having the UE 116 provide any adjustment to the codebook 316 or without the UE 116 calculating the weight adjustment vector G. Based on RSRP feedback received from the UE 116 or on a sounding reference signal (RS), the eNB 110 calculates the weight adjustment vector G at block 516, and at block 518 adjusts the precoding vector selected from the codebook 316 based on the PMI feedback by applying the calculated weight adjustment vector. The weight adjustment vector may be obtained by the eNB 110 from a sounding RS measurement or other measurement. The eNB 110 may then transmit data at block 520 using the thus adjusted precoding vector. In one or more embodiments, a physical downlink shared channel (PDSCH) may be decoded based at least in part on such RS measurements, which may obviate any need for standardization for the UE transparent method 500, although the scope of the claimed subject matter is not limited in this respect.

Figure 6:
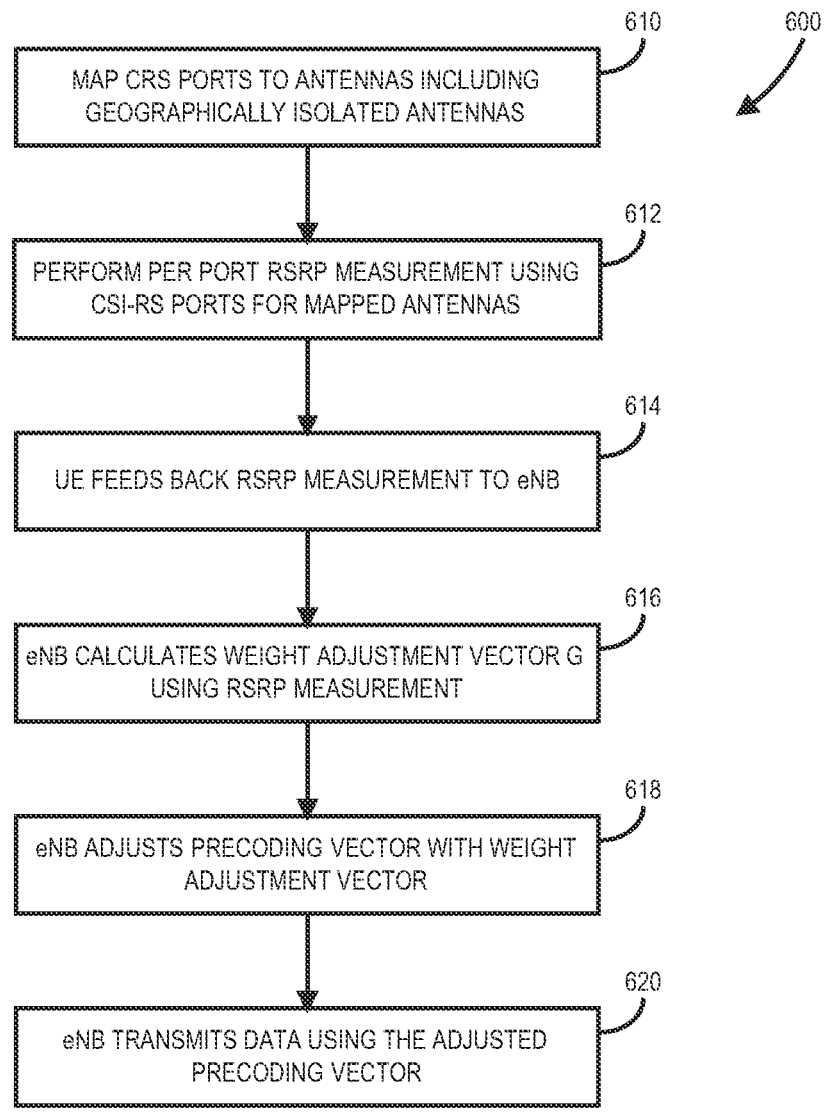
FIG. 6 is a flow diagram of a method to adjust the codebook for geographically separated antennas based at least in part on channel state indicator reference signals (CSI-RS) based RSRP measurement in accordance with one or more embodiments.

Referring now to FIG. 6, a flow diagram of a method to adjust the codebook for geographically separated antennas based at least in part on channel state indicator reference signals (CSI-RS) based RSRP measurement in accordance with one or more embodiments will be discussed. Although method 600 of FIG. 6 illustrates one particular embodiment of a method to adjust a codebook 316, other embodiments of method 600 may include greater or fewer blocks than shown, and/or in various different orders, and the scope of the claimed subject matter is not limited in this respect. FIG. 6 illustrates approach to obtain reference signal received power (RSRP) measurements for the respective antennas of geographically separated antenna sets wherein the codebook 316 may be adjusted using such RSRP measurements. In a general deployment, each antenna of eNB 110 may have a corresponding channel state indicator reference signals (CSI-RS or just CRS) port. By obtaining RSRP measurements for all of the CRS ports, the RSRP measurements may be utilized to determine the performance difference among different sets of geographically separated antennas. Thus, in one or more embodiments the CRS ports may be mapped at block 610 to multiple antennas of eNB 110 including to the sets of geographically separated antennas. In one or more particular embodiments, CRS ports may be mapped to fewer than all of the antennas, for example where each respective set of antennas is mapped with at least one CRS port. Then, per port RSRP measurements may be made at block 612 using the CSI-RS ports for the mapped antennas. In such embodiments per port RSRP measurements may be made for the mapped CSI-RS ports. The UE 116 then feeds back the RSRP measurements to the eNB 110 at block 614. The eNB 110 calculates the weight adjustment vector G at block 616 using the RSRP measurements which may be utilized at block 618 to adjust the precoding vector obtained from the codebook 316. The eNB 110 may then transmit data to UE 116 using the adjusted precoding vector 620. In one or more embodiments, the Layer 3 mobility measurements may be adjusted according to the method 600 of FIG. 6, although the scope of the claimed subject matter is not limited in this respect.

Figure 7:
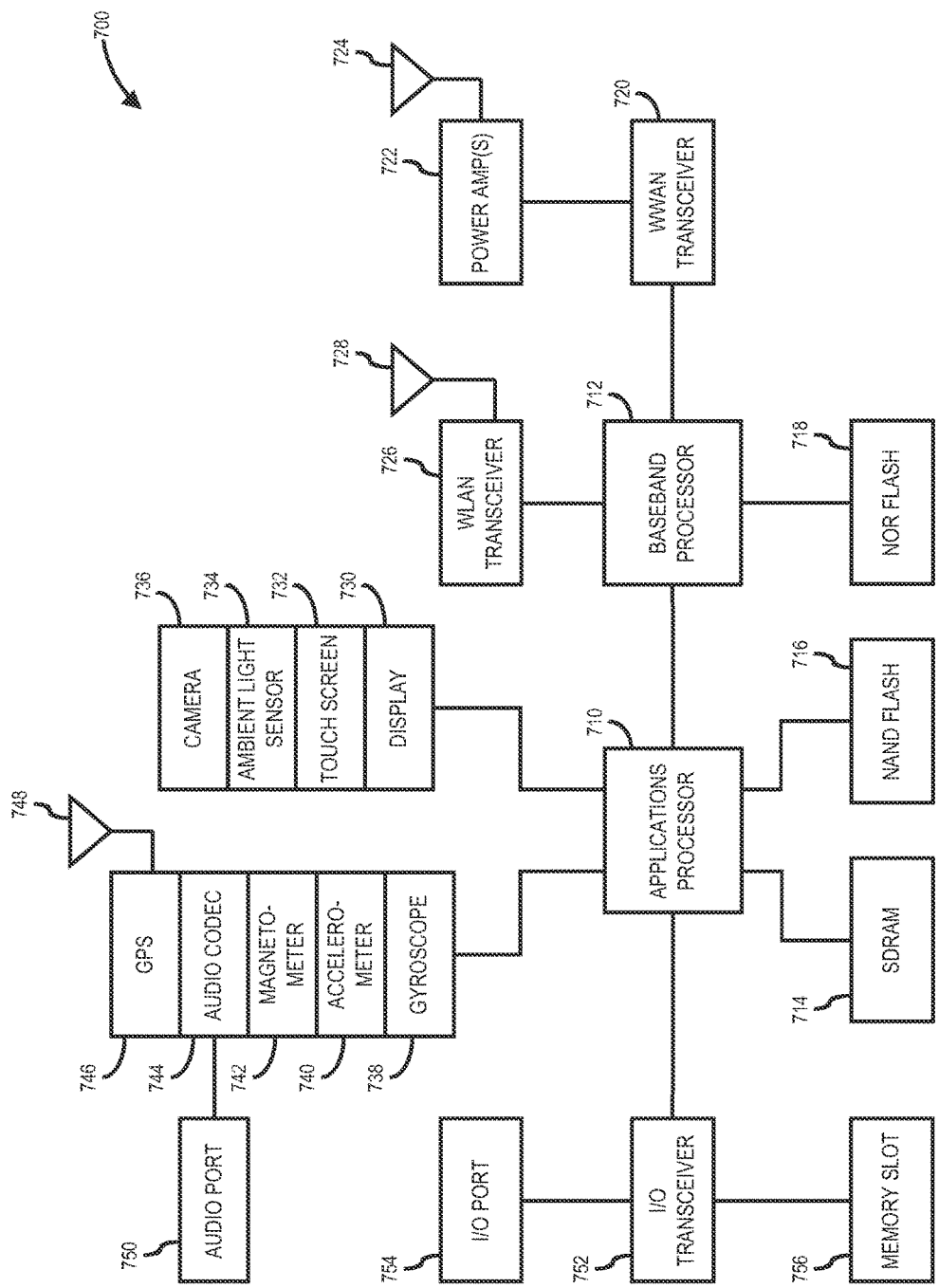
FIG. 7 is a block diagram of an information handling system capable of adjusting a codebook for geographically separated antennas in accordance with one or more embodiments.

Referring now to FIG. 7, a block diagram of an information handling system capable of adjusting a codebook for geographically separated antennas in accordance with one or more embodiments will be discussed. Information handling system 700 of FIG. 7 may tangibly embody one or more of any of the network elements, infrastructure nodes, or devices of the network 100 or network 200 as shown in and described with respect to FIG. 1 or FIG. 2. For example, information handling system 700 may represent the hardware of eNB 110, UE 116, and/or RRU 118, with greater or fewer components depending on the hardware specifications of the particular device, node, or network element. Although information handling system 700 represents one example of several types of computing platforms, information handling system 700 may include more or fewer elements and/or different arrangements of elements than shown in FIG. 7, and the scope of the claimed subject matter is not limited in these respects.

In one or more embodiments, information handling system 700 may include an applications processor 710 and a baseband processor 712. Applications processor 710 may be utilized as a general purpose processor to run applications and the various subsystems for information handling system 700. Applications processor 710 may include a single core or alternatively may include multiple processing cores wherein one or more of the cores may comprise a digital signal processor or digital signal processing core. Furthermore, applications processor 710 may include a graphics processor or coprocessor disposed on the same chip, or alternatively a graphics processor coupled to applications processor 710 may comprise a separate, discrete graphics chip. Applications processor 710 may include on board memory such as cache memory, and further may be coupled to external memory devices such as synchronous dynamic random access memory (SDRAM) 714 for storing and/or executing applications during operation, and NAND flash 716 for storing applications and/or data even when information handling system 700 is powered off. Baseband processor 712 may control the broadband radio functions for information handling system 700. Baseband processor 712 may store code for controlling such broadband radio functions in a NOR flash 718. Baseband processor 712 controls a wireless wide area network (WWAN) transceiver 720 which is used for modulating and/or demodulating broadband network signals, for example for communicating via a 3GPP LTE network or the like as discussed herein with respect to FIG. 2. The WWAN transceiver 720 couples to one or more power amps 722 respectively coupled to one or more antennas 724 for sending and receiving radio-frequency signals via the WWAN broadband network. The baseband processor 712 also may control a wireless local area network (WLAN) transceiver 726 coupled to one or more suitable antennas 728 and which may be capable of communicating via a Wi-Fi, Bluetooth, and/or an amplitude modulation (AM) or frequency modulation (FM) radio standard including an IEEE 802.11 a/b/g/n standard or the like. It should be noted that these are merely example implementations for applications processor 710 and baseband processor 712, and the scope of the claimed subject matter is not limited in these respects. For example, any one or more of SDRAM 714, NAND flash 716 and/or NOR flash 718 may comprise other types of memory technology such as magnetic memory, chalcogenide memory, phase change memory, or ovonic memory, and the scope of the claimed subject matter is not limited in this respect.

In one or more embodiments, applications processor 710 may drive a display 730 for displaying various information or data, and may further receive touch input from a user via a touch screen 732 for example via a finger or a stylus. An ambient light sensor 734 may be utilized to detect an amount of ambient light in which information handling system 700 is operating, for example to control a brightness or contrast value for display 730 as a function of the intensity of ambient light detected by ambient light sensor 734. One or more cameras 736 may be utilized to capture images that are processed by applications processor 710 and/or at least temporarily stored in NAND flash 716. Furthermore, applications processor may couple to a gyroscope 738, accelerometer 740, magnetometer 742, audio coder/decoder (CODEC) 744, and/or global positioning system (GPS) controller 746 coupled to an appropriate GPS antenna 748, for detection of various environmental properties including location, movement, and/or orientation of information handling system 700. Alternatively, controller 746 may comprise a Global Navigation Satellite System (GNSS) controller. Audio CODEC 744 may be coupled to one or more audio ports 750 to provide microphone input and speaker outputs either via internal devices and/or via external devices coupled to information handling system via the audio ports 750, for example via a headphone and microphone jack. In addition, applications processor 710 may couple to one or more input/output (I/O) transceivers 752 to couple to one or more I/O ports 754 such as a universal serial bus (USB) port, a high-definition multimedia interface (HDMI) port, a serial port, and so on. Furthermore, one or more of the I/O transceivers 752 may couple to one or more memory slots 756 for optional removable memory such as secure digital (SD) card or a subscriber identity module (SIM) card, although the scope of the claimed subject matter is not limited in these respects.

Figure 8:
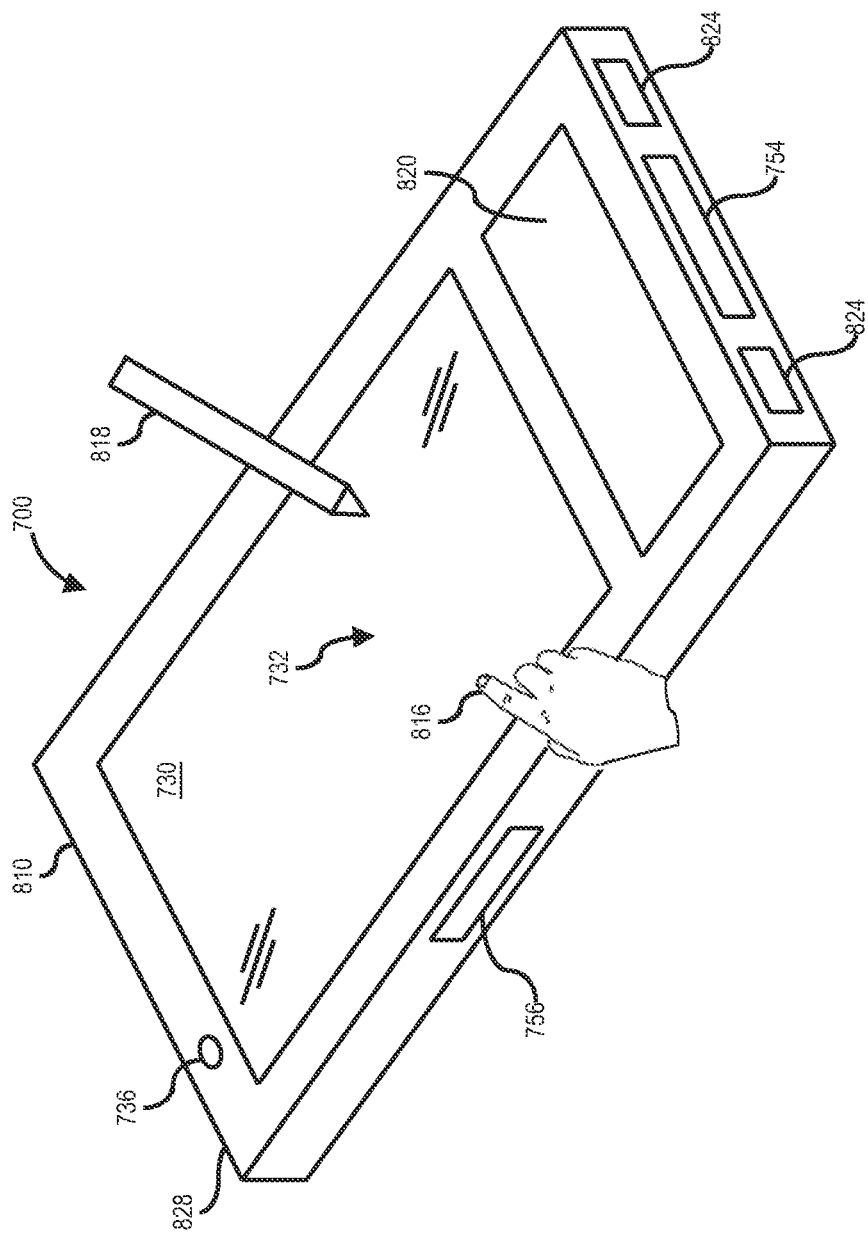
FIG. 8 is an isometric view of the information handling system of FIG. 7 that optionally may include a touch screen in accordance with one or more embodiments.

Referring now to FIG. 8, an isometric view of the information handling system of FIG. 7 that optionally may include a touch screen in accordance with one or more embodiments will be discussed. FIG. 8 shows an example implementation of information handling system 700 of FIG. 7 tangibly embodied as a cellular telephone, smartphone, or tablet type device or the like. In one or more embodiments, the information handling system 700 may comprise any one of the user equipment (UE) devices of FIG. 1 or FIG. 2, although the scope of the claimed subject matter is not limited in this respect. The information handling system 700 may comprise a housing 810 having a display 730 which may include a touch screen 732 for receiving tactile input control and commands via a finger 816 of a user and/or a via stylus 818 to control one or more applications processors 710. The housing 810 may house one or more components of information handling system 700, for example one or more applications processors 710, one or more of SDRAM 714, NAND flash 716, NOR flash 718, baseband processor 712, and/or WWAN transceiver 720. The information handling system 700 further may optionally include a physical actuator area 820 which may comprise a keyboard or buttons for controlling information handling system via one or more buttons or switches. The information handling system 700 may also include a memory port or slot 756 for receiving non-volatile memory such as flash memory, for example in the form of a secure digital (SD) card or a subscriber identity module (SIM) card. Optionally, the information handling system 700 may further include one or more speakers and/or microphones 824 and a connection port 754 for connecting the information handling system 700 to another electronic device, dock, display, battery charger, and so on. In addition, information handling system 700 may include a headphone or speaker jack 828 and one or more cameras 736 on one or more sides of the housing 810. It should be noted that the information handling system 700 of FIG. 8 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to geographically isolated antennas and/or many of its attendant utilities will be understood by the forgoing description, and it will be apparent that various changes may be made in the form, construction and/or arrangement of the components thereof without departing from the scope of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of an evolved Node B (eNB), comprising:
one or more baseband processors to map one or more common reference signal (CRS) ports to one or more antennas of a first set of antennas located near the eNB, and to map one or more CRS ports to one or more antennas of a second set of antennas geographically separated from the first set of antennas;
a radio-frequency (RF) transceiver to transmit one or more reference signals to a user equipment (UE) from the first set of antennas and from the second set of antennas and to receive feedback from the UE in response to the transmission, wherein the feedback includes one or more reference signal received power (RSRP) measurements from the first set of antennas and one or more RSRP measurements from the second set of antennas, wherein per port RSRP measurements are obtained from both the first set of antennas and the second set of antennas;

wherein the one or more baseband processors are to select a precoding vector from a codebook based at least in part on the RSRP measurements received from the UE; and wherein the RF transceiver is to transmit data to the UE using the selected precoding vector.

2. The apparatus as claimed in claim 1, wherein the feedback received from the UE includes a precoding matrix indicator.

3. The apparatus as claimed in claim 1, wherein information in the feedback accommodates antenna gain imbalance between the first set of antennas and the second set of antennas.

4. The apparatus as claimed in claim 1, wherein the RSRP measurements are obtained per each CRS port mapped to one or more of the first set of antennas and one or more of the second set of antennas.

5. An apparatus of a user equipment (UE), comprising:
a radio-frequency (RF) transceiver to receive one or more reference signals transmitted from a first set of antennas of an eNB located near the eNB and from a second set of antennas of the eNB geographically isolated from the first set of antennas, wherein one or more common reference signal (CRS) ports are mapped to one or more antennas of the first set of antennas, and one or more CRS ports are mapped to one or more antennas of the second set of antennas;
one or more baseband processors to perform one or more per port RSRP measurements on the one or more references signals, wherein per port RSRP measurements are obtained from both the first set of antennas and the second set of antennas;
wherein the RF transceiver is to transmit feedback to the eNB, wherein the feedback includes the one or more RSRP measurements and to receive data transmitted from the eNB via the first set of antenna ports and the second set of antenna ports using a precoding vector selected based on the one or more per port RSRP measurements.

6. The apparatus as claimed claim 5, wherein the feedback transmitted to the eNB includes a precoding matrix indicator.

7. The apparatus as claimed in claim 5, wherein information in the feedback accommodates antenna gain imbalance between the first set of antennas and the second set of antennas.

8. The apparatus as claimed in claim 5, wherein the RSRP measurement is obtained per each CRS port mapped to one or more of the first set of antennas and one or more of the second set of antennas.

9. One or more non-transitory machine-readable media having instructions stored thereon that, if executed by an evolved Node B (eNB), result in:
mapping one or more common reference signal (CRS) ports to one or more antennas of a first set of antennas located near the eNB, and to map one or more CRS ports to one or more antennas of a second set of antennas geographically separated from the first set of antennas;
transmitting one or more reference signals to a user equipment (UE) from the first set of antennas and from the second set of antennas and to receive feedback from the UE in response to the transmission, wherein the feedback includes one or more reference signal received power (RSRP) measurements from the first set of antennas and one or more RSRP measurements from the second set of antennas, wherein per port RSRP measurements are obtained from both the first set of antennas and the second set of antennas;

selecting a precoding vector from a codebook based at least in part on the RSRP measurements received from the UE;

transmitting data to the UE using the selected precoding vector.

10. The one or more non-transitory machine-readable media as claimed in claim 9, wherein the feedback received from the UE includes a precoding matrix indicator.

11. The one or more non-transitory machine-readable media as claimed in claim 9, wherein information in the feedback accommodates antenna gain imbalance between the first set of antennas and the second set of antennas.

12. The one or more non-transitory machine-readable media as claimed in claim 9, wherein the RSRP measurements are obtained per each CRS port mapped to one or more of the first set of antennas and one or more of the second set of antennas.

13. One or more non-transitory machine-readable media having instructions stored thereon that, if executed by a user equipment (UE), result in:
a radio-frequency (RF) transceiver to receive one or more reference signals transmitted from a first set of antennas of an eNB located near the eNB and from a second set of antennas of the eNB geographically isolated from the first set of antennas, wherein one or more common reference signal (CRS) ports are mapped to one or more antennas of the first set of antennas, and one or more CRS ports are mapped to one or more antennas of the second set of antennas;
one or more baseband processors to perform one or more per port RSRP measurements on the one or more references signals, wherein per port RSRP measurements are obtained from both the first set of antennas and the second set of antennas;
wherein the RF transceiver is to transmit feedback to the eNB, wherein the feedback includes the one or more RSRP measurements and to receive data transmitted from the eNB via the first set of antenna ports and the second set of antenna ports using a precoding vector selected based on the one or more RSRP measurements.

14. The one or more non-transitory machine-readable media as claimed in claim 13, wherein the feedback transmitted to the eNB includes a precoding matrix indicator.

15. The one or more non-transitory machine-readable media claimed in claim 13, wherein information in the feedback accommodates antenna gain imbalance between the first set of antennas and a second set of antennas.

16. The one or more non-transitory machine-readable media as claimed in claim 13, wherein the RSRP measurement is obtained per each CRS port mapped to one or more of the first set of antennas and one or more of the second set of antennas.

* * * * *